United States Patent
Wu

(10) Patent No.: US 10,419,167 B2
(45) Date of Patent: Sep. 17, 2019

(54) RLC DATA PACKET RETRANSMISSION METHOD AND ENODEB

(71) Applicant: Huawei Technologies Co., Ltd., Shenzhen (CN)

(72) Inventor: Huanyu Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 94 days.

(21) Appl. No.: 15/671,667

(22) Filed: Aug. 8, 2017

(65) Prior Publication Data

US 2017/0338913 A1 Nov. 23, 2017

Related U.S. Application Data

(63) Continuation of application No. PCT/CN2015/072575, filed on Feb. 9, 2015.

(51) Int. Cl.
*H04L 1/18* (2006.01)
*H04W 72/12* (2009.01)
(Continued)

(52) U.S. Cl.
CPC .......... *H04L 1/1812* (2013.01); *H04L 1/1822* (2013.01); *H04L 1/1825* (2013.01);
(Continued)

(58) Field of Classification Search
CPC ... H04L 1/1635; H04L 1/1657; H04L 1/1812; H04L 1/1816; H04L 1/1825; H04L 2001/0097; H04W 72/12; H04W 84/045
See application file for complete search history.

(56) References Cited

U.S. PATENT DOCUMENTS 8,767,616 B2 * 7/2014 Choi .................. G01S 19/03
370/317
9,301,286 B2 * 3/2016 Chung ................ H04L 5/0055
(Continued)

FOREIGN PATENT DOCUMENTS

CN 103391172 A 11/2013
CN 103581933 A 2/2014
(Continued)

*Primary Examiner* — Eric Nowlin
(74) *Attorney, Agent, or Firm* — Leydig, Voit & Mayer, Ltd.

(57) ABSTRACT

The present invention relates to the field of communications technologies, and in particular, to a Radio Link Control (RLC) data packet retransmission method and an eNodeB, so as to resolve a technical problem that a throughput of user equipment (UE) is relatively low because of a relatively large retransmission delay caused when a micro eNodeB performs a hybrid automatic repeat request (HARQ) on a data packet. In embodiments of the present invention, if feedback information that is received by a macro eNodeB for an RLC data packet transmitted by a micro eNodeB is a NACK, the macro eNodeB determines whether a HARQ combination gain can be obtained by performing a HARQ on the RLC data packet by the micro eNodeB. If the HARQ combination gain can be obtained, the micro eNodeB retransmits the RLC data packet in a HARQ manner, so that the throughput of UE can be improved.

8 Claims, 2 Drawing Sheets

A macro eNodeB receives, by using a primary serving cell, feedback information of CA UE for an RLC data packet that is transmitted by a micro eNodeB to the UE by using a secondary serving cell — 201

If the feedback information is a NACK, the macro eNodeB determines whether a HARQ combination gain can be obtained by performing a HARQ on the RLC data packet by the micro eNodeB by using the secondary serving cell — 202

If the HARQ combination gain can be obtained, the macro eNodeB sends the feedback information to the micro eNodeB, and instructs the micro eNodeB to retransmit the RLC data packet to the UE in a HARQ manner — 203

(51) Int. Cl.
*H04W 84/04* (2009.01)
*H04L 1/00* (2006.01)

(52) U.S. Cl.
CPC ..... *H04W 72/12* (2013.01); *H04L 2001/0097* (2013.01); *H04W 84/045* (2013.01)

(56) References Cited

U.S. PATENT DOCUMENTS

| | | | |
|---|---|---|---|
| 9,320,027 B2 * | 4/2016 | Chung | H04L 5/0055 |
| 9,462,587 B2 * | 10/2016 | Seo | H04L 5/001 |
| 9,578,616 B2 * | 2/2017 | Etemad | H04W 76/27 |
| 9,681,457 B2 * | 6/2017 | Huang | H04L 1/00 |
| 9,743,409 B2 * | 8/2017 | Seo | H04L 5/001 |
| 10,039,106 B2 * | 7/2018 | Seo | H04L 5/001 |
| 10,104,624 B2 * | 10/2018 | Sundararajan | H04W 52/50 |
| 2012/0099491 A1 * | 4/2012 | Lee | H04L 1/0015 370/280 |
| 2012/0127950 A1 * | 5/2012 | Chung | H04L 5/0055 370/329 |
| 2012/0140690 A1 * | 6/2012 | Choi | G01S 19/03 370/311 |
| 2012/0163357 A1 * | 6/2012 | Won | H04L 1/1671 370/338 |
| 2012/0230272 A1 * | 9/2012 | Kim | H04L 1/1861 370/329 |
| 2013/0089051 A1 * | 4/2013 | Bai | H04W 52/243 370/329 |
| 2013/0114561 A1 * | 5/2013 | Simonsson | H04B 7/022 370/329 |
| 2014/0016598 A1 * | 1/2014 | Kwon | H04L 5/0023 370/329 |
| 2014/0119323 A1 * | 5/2014 | Chung | H04L 5/0055 370/329 |
| 2014/0226481 A1 | 8/2014 | Dahod et al. | |
| 2015/0098319 A1 * | 4/2015 | Yie | H04L 5/0057 370/229 |
| 2015/0124762 A1 * | 5/2015 | Yie | H04L 5/0057 370/329 |
| 2015/0180619 A1 * | 6/2015 | Majjigi | H04L 5/0005 370/330 |
| 2015/0223220 A1 * | 8/2015 | Zhao | H04W 24/02 455/450 |
| 2015/0236834 A1 * | 8/2015 | Seo | H04L 5/0055 370/329 |
| 2016/0057769 A1 * | 2/2016 | Chatterjee | H04W 4/70 370/328 |
| 2016/0134351 A1 * | 5/2016 | Choi | H04L 1/0026 370/328 |
| 2016/0249338 A1 * | 8/2016 | Hwang | H04L 1/1861 |
| 2016/0286561 A1 * | 9/2016 | Huang | H04L 1/00 |
| 2016/0381689 A1 * | 12/2016 | Seo | H04L 5/001 370/280 |
| 2017/0019944 A1 * | 1/2017 | Teng | H04W 16/32 |
| 2017/0325234 A1 * | 11/2017 | Seo | H04L 5/001 |
| 2018/0132189 A1 * | 5/2018 | Sundararajan | H04W 52/50 |
| 2018/0192338 A1 * | 7/2018 | Axmon | H04W 36/0083 |
| 2018/0241530 A1 * | 8/2018 | Takeda | H04W 28/04 |
| 2018/0343097 A1 * | 11/2018 | Takeda | H04J 1/00 |

FOREIGN PATENT DOCUMENTS

| | | |
|---|---|---|
| CN | 104303579 A | 1/2015 |
| EP | 2908570 A1 | 8/2015 |
| WO | 2014056198 A1 | 4/2014 |
| WO | 2014075210 A1 | 5/2014 |

* cited by examiner

RLC DATA PACKET RETRANSMISSION METHOD AND ENODEB

CROSS-REFERENCE TO RELATED APPLICATIONS

This application is a continuation of International Application No. PCT/CN2015/072575, filed on Feb. 9, 2015, the disclosure of which is hereby incorporated by reference in its entirety.

TECHNICAL FIELD

The present invention relates to the field of communications technologies, and in particular, to an RLC data packet retransmission method and an eNodeB.

BACKGROUND

A Long Term Evolution (LTE) system includes an evolved packet core (EPC), an evolved NodeB (eNodeB), and user equipment (UE). The EPC is a core network part, and includes a mobility management entity (MME) that is responsible for signaling processing and a serving gateway (SGW) that is responsible for data processing. The eNodeB is connected to the EPC by using an S1 interface, eNodeBs are connected by using an X2 interface, and the eNodeB is connected to the user equipment by using a Uu interface.

An evolved universal terrestrial radio access network (E-UTRAN) includes eNodeBs and is responsible for implementing a radio-related function. An E-UTRAN protocol framework includes a user-plane protocol and a control plane protocol. A user-plane protocol stack includes a Packet Data Convergence Protocol (PDCP), Radio Link Control (RLC), and a Media Access Control (MAC).

Referring to FIG. 1, in the prior art, a data packet may be transmitted from a PDCP entity to an RLC entity. The RLC entity may include a transparent mode (TM), an unacknowledged mode (UM), and an acknowledged mode (AM). The RLC entity shown in FIG. 1 is an acknowledged mode RLC entity.

For a carrier aggregation (CA) scenario of an ideal backhaul heterogeneous network (HetNet), in the acknowledged mode of the RLC, data packets may be offloaded to a macro eNodeB to which a primary cell (Pcell) belongs and a micro eNodeB to which a secondary cell (Scell) belongs, so as to separately send the data packets to user equipment (UE) by using the primary cell and the secondary cell, and improve data sending efficiency.

After receiving the data packets, the user equipment sends, to the macro eNodeB, feedback information for the data packets transmitted by the macro eNodeB and the micro eNodeB. The feedback information may generally include two types: an acknowledgement (ACK)/a negative acknowledgement (NACK). For example, if feedback information that is received by the macro eNodeB for a data packet transmitted by the micro eNodeB is a NACK, the macro eNodeB generally sends the NACK to the micro eNodeB, and the micro eNodeB generally processes the data packet in a manner of performing a hybrid automatic repeat request (HARQ) by using the secondary cell.

However, when the micro eNodeB performs the HARQ on the data packet, if all HARQ processes have been occupied, no data packet can be retransmitted until a HARQ process is idle. This increases a retransmission delay, causes a relatively low throughput of the user equipment, and reduces efficiency of the HARQ.

SUMMARY

Embodiments of the present invention provide an RLC data packet retransmission method and an eNodeB, so as to resolve a technical problem that a throughput of user equipment is relatively low because of a relatively large retransmission delay caused when a micro eNodeB performs a HARQ on a data packet.

A first aspect of the present invention provides an RLC data packet retransmission method, including:

receiving, by a macro eNodeB by using a primary cell, feedback information of a carrier aggregation user equipment for an RLC data packet that is transmitted by a micro eNodeB to the user equipment by using a secondary cell, where the user equipment camps on the primary cell, and carrier aggregation is performed between the user equipment and each of the macro eNodeB and the micro eNodeB;

if the feedback information is a NACK, determining, by the macro eNodeB, whether a HARQ combination gain can be obtained by performing a HARQ on the RLC data packet by the micro eNodeB by using the secondary cell; and if the HARQ combination gain can be obtained, sending, by the macro eNodeB, the feedback information to the micro eNodeB, and instructing the micro eNodeB to retransmit the RLC data packet to the user equipment in a HARQ manner.

With reference to the first aspect, in a first possible implementation of the first aspect, the determining, by the macro eNodeB, whether a HARQ combination gain can be obtained by performing a HARQ on the RLC data packet by the micro eNodeB by using the secondary cell specifically includes:

when the macro eNodeB determines that a quantity of HARQ processes that are currently used by the micro eNodeB in the secondary cell is less than a maximum quantity of HARQ processes, determining, by the macro eNodeB, that the HARQ combination gain can be obtained by performing the HARQ on the RLC data packet by the micro eNodeB by using the secondary cell.

With reference to the first aspect or the first possible implementation of the first aspect, in a second possible implementation of the first aspect, the method further includes:

if the macro eNodeB determines that the HARQ combination gain cannot be obtained by performing the HARQ on the RLC data packet by the micro eNodeB by using the secondary cell, retransmitting, by the macro eNodeB, the RLC data packet to the user equipment in an ARQ manner by using the primary cell.

With reference to the second possible implementation of the first aspect, in a third possible implementation of the first aspect, before the receiving, by a macro eNodeB by using a primary cell, feedback information of a carrier aggregation user equipment for an RLC data packet that is transmitted by a micro eNodeB to the user equipment by using a secondary cell, the method further includes:

receiving, by the macro eNodeB, an RLC packet assembly result sent by the micro eNodeB, where the RLC packet assembly result is used to indicate information about the RLC data packet that is transmitted by the micro eNodeB to the user equipment by using the secondary cell, and the RLC data packet that is transmitted by the micro eNodeB to the user equipment by using the secondary cell is some or all of RLC data packets that are offloaded by the macro eNodeB to the micro eNodeB; and the retransmitting, by the macro eNodeB, the RLC data packet to the user equipment in an ARQ manner by using the primary cell specifically includes:

retransmitting, by the macro eNodeB, the RLC data packet to the user equipment in the ARQ manner according to the RLC packet assembly result by using the primary cell.

With reference to the first aspect or the first possible implementation of the first aspect, in a fourth possible implementation of the first aspect, the method further includes:

if the macro eNodeB determines that the HARQ combination gain cannot be obtained by performing the HARQ on the RLC data packet by the micro eNodeB by using the secondary cell, sending, by the macro eNodeB, the feedback information to the micro eNodeB, and instructing the micro eNodeB to retransmit the RLC data packet to the user equipment in an ARQ manner by using the secondary cell.

A second aspect of the present invention provides a macro eNodeB, including:

a first receiving module, configured to receive, by using a primary cell, feedback information of a carrier aggregation user equipment for an RLC data packet that is transmitted by a micro eNodeB to the user equipment by using a secondary cell, where the user equipment camps on the primary cell, and carrier aggregation is performed between the user equipment and each of the macro eNodeB and the micro eNodeB;

a determining module, configured to: if the feedback information is a NACK, determine whether a HARQ combination gain can be obtained by performing a HARQ on the RLC data packet by the micro eNodeB by using the secondary cell; and a first sending module, configured to: if the HARQ combination gain can be obtained, send the feedback information to the micro eNodeB, and instruct the micro eNodeB to retransmit the RLC data packet to the user equipment in a HARQ manner.

With reference to the second aspect, in a first possible implementation of the second aspect, the determining module is specifically configured to:

when it is determined that a quantity of HARQ processes that are currently used by the micro eNodeB in the secondary cell is less than a maximum quantity of HARQ processes, determine that the HARQ combination gain can be obtained by performing the HARQ on the RLC data packet by the micro eNodeB by using the secondary cell.

With reference to the second aspect or the first possible implementation of the second aspect, in a second possible implementation of the second aspect, the macro eNodeB further includes a retransmission module, configured to:

if the determining module determines that the HARQ combination gain cannot be obtained by performing the HARQ on the RLC data packet by the micro eNodeB by using the secondary cell, retransmit the RLC data packet to the user equipment in an ARQ manner by using the primary cell and a second sending module of the macro eNodeB.

With reference to the second possible implementation of the second aspect, in a third possible implementation of the second aspect, the macro eNodeB further includes a second receiving module, where the second receiving module is configured to: before the first receiving module receives, by using the primary cell, the feedback information of the carrier aggregation user equipment for the RLC data packet that is transmitted by the micro eNodeB to the user equipment by using the secondary cell, receive an RLC packet assembly result sent by the micro eNodeB, where the RLC packet assembly result is used to indicate information about the RLC data packet that is transmitted by the micro eNodeB to the user equipment by using the secondary cell, and the RLC data packet that is transmitted by the micro eNodeB to the user equipment by using the secondary cell is some or all of RLC data packets that are offloaded by the macro eNodeB to the micro eNodeB; and the retransmission module is specifically configured to retransmit the RLC data packet to the user equipment in the ARQ manner according to the RLC packet assembly result by using the primary cell and the second sending module of the macro eNodeB.

With reference to the second aspect or the first possible implementation of the second aspect, in a fourth possible implementation of the second aspect, the first sending module is further configured to:

if the determining module determines that the HARQ combination gain cannot be obtained by performing the HARQ on the RLC data packet by the micro eNodeB by using the secondary cell, send the feedback information to the micro eNodeB, and instruct the micro eNodeB to retransmit the RLC data packet to the user equipment in an ARQ manner by using the secondary cell.

A third aspect of the present invention provides a macro eNodeB, including a memory, a processor, a transceiver, and an interface that are connected to a same bus, where the memory is configured to store an instruction;

the transceiver is configured to receive, by using a primary cell, feedback information of a carrier aggregation user equipment for an RLC data packet that is transmitted by a micro eNodeB to the user equipment by using a secondary cell, where the user equipment camps on the primary cell, and carrier aggregation is performed between the user equipment and each of the macro eNodeB and the micro eNodeB; and the processor invokes the instruction stored in the memory to: if the feedback information is a negative acknowledgement (NACK), determine whether a HARQ combination gain can be obtained by performing a HARQ on the RLC data packet by the micro eNodeB by using the secondary cell; and if the HARQ combination gain can be obtained, send the feedback information to the micro eNodeB by using the interface, and instruct the micro eNodeB to retransmit the RLC data packet to the user equipment in a HARQ manner.

With reference to the third aspect, in a first possible implementation of the third aspect, the processor is specifically configured to:

when it is determined that a quantity of HARQ processes that are currently used by the micro eNodeB in the secondary cell is less than a maximum quantity of HARQ processes, determine that the HARQ combination gain can be obtained by performing the HARQ on the RLC data packet by the micro eNodeB by using the secondary cell.

With reference to the third aspect or the first possible implementation of the third aspect, in a second possible implementation of the third aspect, the processor is further configured to:

if it is determined that the HARQ combination gain cannot be obtained by performing the HARQ on the RLC data packet by the micro eNodeB by using the secondary cell, retransmit the RLC data packet to the user equipment in an ARQ manner by using the primary cell and the transceiver.

With reference to the second possible implementation of the third aspect, in a third possible implementation of the third aspect, the interface is configured to: before the transceiver receives, by using the primary cell, the feedback information of the carrier aggregation user equipment for the RLC data packet that is transmitted by the micro eNodeB to the user equipment by using the secondary cell, receive an RLC packet assembly result sent by the micro eNodeB, where the RLC packet assembly result is used to indicate information about the RLC data packet that is transmitted by the micro eNodeB to the user equipment by using the secondary cell, and the RLC data packet that is transmitted by the micro eNodeB to the user equipment by using the secondary cell is some or all of RLC data packets that are offloaded by the macro eNodeB to the micro eNodeB; and the processor is specifically configured to retransmit the RLC data packet to the user equipment in the ARQ manner according to the RLC packet assembly result by using the primary cell and the transceiver.

With reference to the third aspect or the first possible implementation of the third aspect, in a fourth possible implementation of the third aspect, the processor is further configured to:

if it is determined that the HARQ combination gain cannot be obtained by performing the HARQ on the RLC data packet by the micro eNodeB by using the secondary cell, send the feedback information to the micro eNodeB by using the interface, and instruct the micro eNodeB to retransmit the RLC data packet to the user equipment in an ARQ manner by using the secondary cell.

In the embodiments of the present invention, if feedback information that is received by a macro eNodeB for an RLC data packet transmitted by a micro eNodeB is a NACK, the macro eNodeB determines whether a HARQ combination gain can be obtained by performing a HARQ on the RLC data packet by the micro eNodeB, that is, whether a delay is relatively small. If the HARQ combination gain can be obtained, the micro eNodeB retransmits the RLC data packet in a HARQ manner. In this way, the retransmission delay is relatively small, and impact on a throughput of user equipment is avoided as much as possible. The RLC data packet does not need to be retransmitted in an automatic repeat request (ARQ) manner because the RLC data packet is processed in the HARQ manner. In addition, a quantity of retransmission times can be reduced in the HARQ manner, and RLC data packet retransmission efficiency can be improved.

DESCRIPTION OF EMBODIMENTS

To make objectives, technical solutions, and advantages of embodiments of the present invention clearer, the following clearly describes technical solutions in embodiments of the present invention with reference to the accompanying drawings. The described embodiments are some but not all of the embodiments of the present invention. All other embodiments obtained by a person of ordinary skill in the art based on the embodiments of the present invention without creative efforts shall fall within the protection scope of the present invention.

A technology described in this specification may be used in an LTE system and a subsequent evolved system of LTE.

In the embodiments of the present invention, an example in which a receive end is user equipment is used.

A primary cell is a cell operating on a primary frequency band. A user equipment establishes a radio resource control (RRC) connection to a macro eNodeB by using the primary cell.

A secondary cell is a cell operating on a secondary frequency band. A user equipment with a carrier aggregation capability completes establishment of an RRC connection to a macro eNodeB. A secondary cell may be configured for the user equipment to provide an extra radio resource.

It should be noted that a scenario in which a HetNet is networked by using a macro eNodeB and a micro eNodeB is used to describe the embodiments of the present invention. In some application scenarios, the macro eNodeB described in the embodiments of the present invention may be replaced with the micro eNodeB. Likewise, in some application scenarios, the micro eNodeB described in the embodiments of the present invention may be replaced with the macro eNodeB. That is, technical solutions in the embodiments of the present invention are also applicable to a scenario in which networking is implemented between macro eNodeBs and a scenario in which networking is implemented between micro eNodeBs.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, unless otherwise described, the character "/" in this specification generally indicates an "or" relationship between the associated objects.

The following further describes the embodiments of the present invention in detail with reference to accompanying drawings in this specification.

Figure 1:
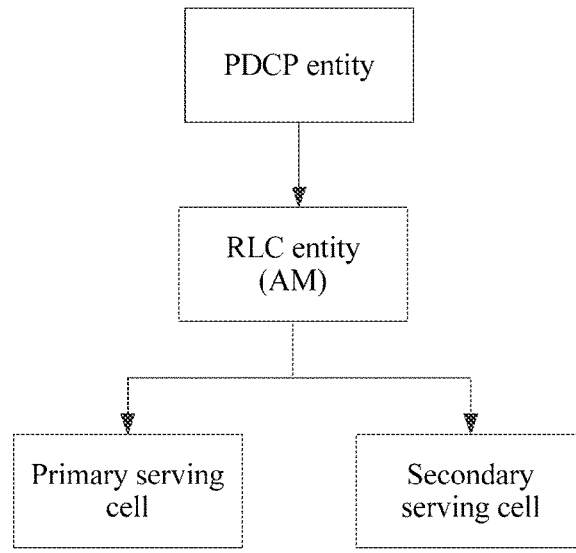
FIG. 1 is a schematic diagram of transmitting an RLC data packet in an acknowledged mode in the prior art.
Figure 2:
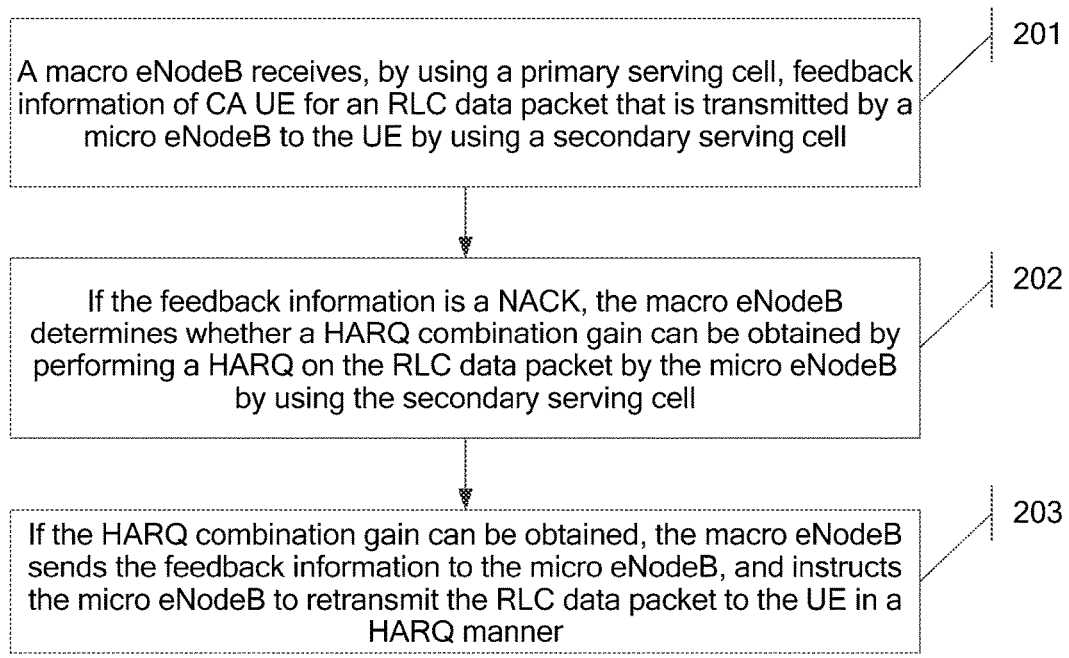
FIG. 2 is a main flowchart of an RLC data packet retransmission method according to an embodiment of the present invention.

Referring to FIG. 2, an embodiment of the present invention provides an RLC data packet retransmission method. A main procedure of the method is described as follows.

Step 201: A macro eNodeB receives, by using a primary cell, feedback information of a carrier aggregation user equipment for an RLC data packet that is transmitted by a micro eNodeB to the user equipment by using a secondary cell.

The user equipment camps on the primary cell, and carrier aggregation is performed between the user equipment and each of the macro eNodeB and the micro eNodeB.

In this embodiment of the present invention, a user equipment with a carrier aggregation capability is referred to as a carrier aggregation user equipment.

Before step 201, the method further includes:

the user equipment with the carrier aggregation capability preferentially camps on a macro eNodeB, that is, the user equipment with the carrier aggregation capability uses a cell of the macro eNodeB as a primary cell of the user equipment with the carrier aggregation capability.

After the user equipment preferentially camps on the macro eNodeB, when the user equipment initiates service bearer establishment to an eNodeB (that is, the macro eNodeB) in the primary cell, the macro eNodeB establishes an RLC data service logical channel that is in an acknowledged mode and that is between the macro eNodeB and the user equipment, and establishes an RLC data service logical channel that is in the acknowledged mode and that is between the micro eNodeB and the user equipment. A cell of the micro eNodeB is a secondary cell of the user equipment.

Then, the macro eNodeB is responsible for separately allocating to-be-transmitted RLC data packets to the macro eNodeB and the micro eNodeB, that is, performing offloading on the to-be-transmitted RLC data packets in the macro eNodeB and the micro eNodeB. In this case, a device used to perform offloading on the RLC data packets may be, for example, the macro eNodeB, or may be an RLC entity in the primary cell. This is not specifically limited in the present invention. In the present invention, an example in which the macro eNodeB is used for offloading is used for description.

In an actual network, transmission between a macro eNodeB and a micro eNodeB is generally non-ideal backhaul transmission. Because a transmission delay between the macro eNodeB and the micro eNodeB is relatively large, performance of a user equipment in a carrier aggregation scenario of a non-ideal backhaul HetNet is affected.

Therefore, in this embodiment of the present invention, the micro eNodeB may request a required RLC data packet at a first moment before a moment at which an RLC data packet is sent to the user equipment. In this way, the macro eNodeB can send, to the micro eNodeB in advance, the RLC data packet required by the micro eNodeB, thereby reducing a transmission delay between the macro eNodeB and the micro eNodeB as much as possible, and improving receiving performance of a user equipment in a carrier aggregation scenario of a non-ideal backhaul HetNet.

If a receive end is the user equipment, after receiving an allocated RLC data packet, the micro eNodeB may send the allocated RLC data packet to an air interface. The user equipment may receive the RLC data packet by using the air interface.

After receiving the RLC data packet, the user equipment sends feedback information specific to each received RLC data packet to the macro eNodeB. Feedback information specific to either of an RLC data packet sent by the micro eNodeB or an RLC data packet sent by the macro eNodeB is sent by the user equipment to the macro eNodeB.

Specifically, processes in which the user equipment with the carrier aggregation capability preferentially camps on the macro eNodeB, the macro eNodeB separately establishes the RLC data service logical channels, the micro eNodeB transmits a to-be-transmitted data packet, the user equipment sends the feedback information to the macro eNodeB, and the like are processes in the prior art. For a specific implementation, reference may be made to the prior art. This is not limited in the present invention.

Optionally, in this embodiment of the present invention, before the receiving, by a macro eNodeB by using a primary cell, feedback information of a carrier aggregation user equipment for an RLC data packet that is transmitted by a micro eNodeB to the user equipment by using a secondary cell, the method further includes:

receiving, by the macro eNodeB, an RLC packet assembly result sent by the micro eNodeB, where the RLC packet assembly result is used to indicate information about the RLC data packet that is transmitted by the micro eNodeB to the user equipment by using the secondary cell, and the RLC data packet that is transmitted by the micro eNodeB to the user equipment by using the secondary cell is some or all of RLC data packets that are offloaded by the macro eNodeB to the micro eNodeB.

The micro eNodeB may transmit, to the user equipment, all the RLC data packets allocated by the macro eNodeB to the micro eNodeB, or may transmit, to the user equipment, only some of the RLC data packets allocated by the macro eNodeB to the micro eNodeB. For example, the macro eNodeB allocates three RLC data packets to the micro eNodeB in total, for example, an RLC data packet 1, an RLC data packet 2, and an RLC data packet 3. The micro eNodeB may transmit all the three RLC data packets to the user equipment, and the RLC packet assembly result is used to indicate information about the three RLC data packets. Alternatively, the micro eNodeB may transmit only the RLC data packet 1 and the RLC data packet 2 of the three RLC data packets to the user equipment, and the RLC packet assembly result is used to indicate information about the RLC data packet 1 and the RLC data packet 2. Alternatively, the micro eNodeB may transmit only the RLC data packet 1 and a part of data in the RLC data packet 2 to the user equipment, and the RLC packet assembly result is used to indicate information about the RLC data packet 1 and the part of data that is in the RLC data packet 2 and that is transmitted to the user equipment.

That is, although the macro eNodeB knows specific RLC data packets that have been allocated to the micro eNodeB, for specific RLC data packets that are in the RLC data packets and that have been transmitted by the micro eNodeB to the user equipment, the macro eNodeB needs to be notified by the micro eNodeB by using the RLC packet assembly result.

For example, when sending the allocated RLC data packets to a receive end (if the receive end is the user equipment, the allocated RLC data packets are sent to an air interface), the micro eNodeB may send the RLC packet assembly result to the macro eNodeB. In this way, the macro eNodeB may know specific RLC data packets that have been transmitted by the micro eNodeB to the user equipment.

Step 202: If the feedback information is a NACK, the macro eNodeB determines whether a HARQ combination gain can be obtained by performing a HARQ on the RLC data packet by the micro eNodeB by using the secondary cell.

Then, if the macro eNodeB determines that the received feedback information for the RLC data packet transmitted by the micro eNodeB is a NACK, the macro eNodeB determines that the RLC data packet corresponding to the NACK needs to be retransmitted.

If the macro eNodeB determines that the RLC data packet corresponding to the NACK needs to be retransmitted, the macro eNodeB may first determine whether the HARQ combination gain can be obtained by performing the HARQ on the RLC data packet by the micro eNodeB by using the secondary cell.

Optionally, in this embodiment of the present invention, the determining, by the macro eNodeB, whether a HARQ combination gain can be obtained by performing a HARQ on the RLC data packet by the micro eNodeB by using the secondary cell specifically includes:

when the macro eNodeB determines that a quantity of HARQ processes that are currently used by the micro eNodeB in the secondary cell is less than a maximum quantity of HARQ processes, determining, by the macro eNodeB, that the HARQ combination gain can be obtained by performing the HARQ on the RLC data packet by the micro eNodeB by using the secondary cell.

If the quantity of HARQ processes that are currently used by the micro eNodeB in the secondary cell is less than the maximum quantity of HARQ processes, it indicates that there is still an idle HARQ process. The micro eNodeB may directly use the idle HARQ process to retransmit a new RLC data packet, so that a retransmission delay is relatively small, a throughput of the user equipment may not be affected basically, and the user equipment can properly obtain the HARQ combination gain.

However, if the quantity of HARQ processes that are currently used by the micro eNodeB in the secondary cell is not less than the maximum quantity of HARQ processes, the micro eNodeB can retransmit a new RLC data packet only when there is an idle HARQ process, and a retransmission delay is relatively large consequently. In this case, if the micro eNodeB still retransmits the new RLC data packet in the HARQ manner by using the secondary cell, the user equipment cannot obtain the HARQ combination gain. Therefore, it is determined, in this manner, whether the HARQ combination gain can be obtained by performing the HARQ on the RLC data packet by the micro eNodeB by using the secondary cell.

Step 203: If the HARQ combination gain can be obtained, the macro eNodeB sends the feedback information to the micro eNodeB, and instructs the micro eNodeB to retransmit the RLC data packet to the user equipment in a HARQ manner.

If it is determined that the HARQ combination gain can be obtained by performing the HARQ on the RLC data packet by the micro eNodeB in the secondary cell, the macro eNodeB may directly send the feedback information to the micro eNodeB, and instruct the micro eNodeB to retransmit the RLC data packet to the user equipment in the HARQ manner. After the micro eNodeB receives the feedback information and an instruction that are sent by the macro eNodeB, where the instruction is used to instruct the micro eNodeB to retransmit the RLC data packet in the HARQ manner, the micro eNodeB retransmits the RLC data packet to the user equipment in the HARQ manner by using the secondary cell. In this case, the micro eNodeB may directly use an idle HARQ process to retransmit the RLC data packet to the user equipment, so that a retransmission delay is relatively small, impact on a throughput of the user equipment is avoided as much as possible, and the user equipment can also obtain the HARQ combination gain.

In this embodiment of the present invention, if the macro eNodeB determines that the HARQ combination gain cannot be obtained by performing the HARQ on the RLC data packet by the micro eNodeB by using the secondary cell, the macro eNodeB has two processing manners:

Manner 1: The macro eNodeB retransmits the RLC data packet to the user equipment in an ARQ manner by using the primary cell.

Manner 2: The macro eNodeB instructs the micro eNodeB to retransmit the RLC data packet to the user equipment in an ARQ manner by using the secondary cell.

The two manners are separately described below.

Manner 1:

Optionally, in this embodiment of the present invention, the method may further include:

if the macro eNodeB determines that the HARQ combination gain cannot be obtained by performing the HARQ on the RLC data packet by the micro eNodeB by using the secondary cell, retransmitting, by the macro eNodeB, the RLC data packet to the user equipment in an ARQ manner by using the primary cell.

Optionally, in this embodiment of the present invention, the retransmitting, by the macro eNodeB, the RLC data packet in an ARQ manner by using the primary cell specifically includes:

retransmitting, by the macro eNodeB, the RLC data packet to the user equipment in the ARQ manner according to the RLC packet assembly result by using the primary cell.

That is, if the macro eNodeB determines that the HARQ combination gain cannot be obtained by performing the HARQ on the RLC data packet by the micro eNodeB by using the secondary cell, the macro eNodeB may use a manner in which the macro eNodeB retransmits the RLC data packet to the user equipment in the ARQ manner.

Before step 201, the macro eNodeB has obtained the RLC packet assembly result and knows the specific RLC data packets that have been transmitted by the micro eNodeB to the user equipment. Therefore, the macro eNodeB may directly transmit the RLC data packet to the user equipment in the ARQ manner.

However, in the prior art, even if the macro eNodeB needs to retransmit the RLC data packet, the macro eNodeB needs to first wait for a serial number (SN) state report fed back by the user equipment, and knows, only after the serial number state report is received, specific RLC data packets that have been transmitted by the micro eNodeB to the user equipment, and then the macro eNodeB can retransmit some or all of the RLC data packets. It can be seen that, compared with the prior art, the technical solution in this embodiment of the present invention reduces an RLC service interaction time and improves transmission efficiency.

Manner 2:

Optionally, in this embodiment of the present invention, the method may further include:

if the macro eNodeB determines that the HARQ combination gain cannot be obtained by performing the HARQ on the RLC data packet by the micro eNodeB by using the secondary cell, sending, by the macro eNodeB, the feedback information to the micro eNodeB, and instructing the micro eNodeB to retransmit the RLC data packet to the user equipment in an ARQ manner by using the secondary cell.

If the macro eNodeB determines that the HARQ combination gain cannot be obtained by performing the HARQ on the RLC data packet by the micro eNodeB by using the secondary cell, the macro eNodeB may use another manner in which the macro eNodeB sends the feedback information to the micro eNodeB, and instructs the micro eNodeB to retransmit the RLC data packet to the user equipment in the ARQ manner by using the secondary cell. After the micro eNodeB receives the feedback information and an instruction that are sent by the macro eNodeB, where the instruction is used to instruct the micro eNodeB to retransmit the RLC data packet in the ARQ manner by using the secondary cell, the micro eNodeB retransmits the RLC data packet in the ARQ manner.

For example, in a frequency division duplexing (FDD) system, a quantity of HARQ processes (ID) specified in a protocol is 8 (that is, a maximum quantity of available HARQ IDs at the air interface). However, because a round-trip time (RTT) of a HARQ exists, RTTs of an actual HARQ are 8+N (N refers to an inter-site unidirectional link delay). In an extreme scenario, a quantity of available HARQ IDs may be insufficient. In the prior art, when all the eight HARQ IDs in the secondary cell have been used and no HARQ ID is released, in this case, if a new RLC data packet needs to be retransmitted by the micro eNodeB, retransmission is not performed temporarily, and the retransmission is performed when there is an idle HARQ ID. That is, because of insufficient HARQ IDs, an RLC data packet cannot be sent at some time. Consequently, a throughput loss of the user equipment is caused. Generally, a negative gain of the throughput loss of the user equipment is $N/(8+N) \times 100\%$.

In addition, in the prior art, if all the eight HARQ IDs have been used and no HARQ ID is released, in this case, if a new RLC data packet needs to be transmitted, a HARQ multiplexing manner may further be used, that is, a used HARQ ID is occupied, and an RLC data packet of the HARQ ID is set as a newly transmitted RLC data packet. In this way, when HARQ retransmission needs to be performed on an RLC data packet sent last time by using the occupied HARQ ID, the RLC data packet can be sent to the receive end only as a newly transmitted RLC data packet, and the RLC data packet cannot be processed as a retransmitted RLC data packet any more. Consequently, the receive end cannot obtain the HARQ combination gain.

After the method in this embodiment of the present invention is used, a macro eNodeB first determines whether a quantity of HARQ IDs that are currently used by a micro eNodeB in a secondary cell is less than a maximum quantity of HARQ IDs (that is, the maximum quantity of HARQ processes). If the quantity of HARQ IDs that are currently used by the micro eNodeB in the secondary cell is less than the maximum quantity of HARQ IDs, it is determined that there is an idle HARQ ID for retransmitting an RLC data packet, and the to-be-retransmitted RLC data packet may be transmitted in a timely manner, that is, a receive end can obtain a HARQ combination gain. However, if the quantity of HARQ IDs that are currently used by the micro eNodeB in the secondary cell is not less than the maximum quantity of HARQ IDs, generally, that is, the quantity of HARQ IDs that are currently used by the micro eNodeB in the secondary cell is equal to the maximum quantity of HARQ IDs, it indicates that no idle HARQ ID may be used to retransmit a new RLC data packet, and the new RLC data packet may not be transmitted in a timely manner. In this embodiment of the present invention, a HARQ manner may be abandoned, and an ARQ manner may be used to retransmit the new RLC data packet, so that the RLC data packet can be retransmitted as soon as possible, a delay required for retransmitting a data packet is reduced, and efficiency of retransmitting the data packet is improved.

Figure 3:
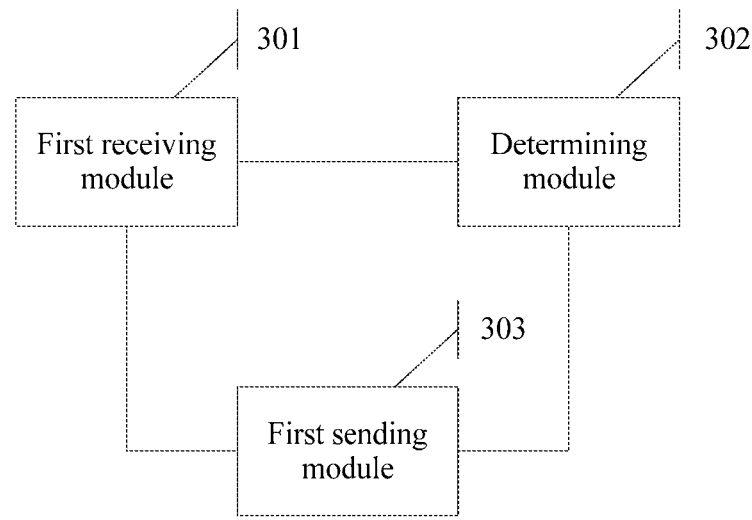
FIG. 3 is a structural block diagram of a macro eNodeB according to an embodiment of the present invention.

Referring to FIG. 3, based on a same inventive concept, an embodiment of the present invention provides a macro eNodeB, and the macro eNodeB may include a first receiving module 301, a determining module 302, and a first sending module 303.

The first receiving module 301 is configured to receive, by using a primary cell, feedback information of a carrier aggregation user equipment for an RLC data packet that is transmitted by a micro eNodeB to the user equipment by using a secondary cell, where the user equipment camps on the primary cell, and carrier aggregation is performed between the user equipment and each of the macro eNodeB and the micro eNodeB.

The determining module 302 is configured to: if the feedback information is a NACK, determine whether a HARQ combination gain can be obtained by performing a HARQ on the RLC data packet by the micro eNodeB by using the secondary cell.

The first sending module 303 is configured to: if the HARQ combination gain can be obtained, send the feedback information to the micro eNodeB, and instruct the micro eNodeB to retransmit the RLC data packet in a HARQ manner.

Optionally, in this embodiment of the present invention, the determining module 302 is specifically configured to:

when it is determined that a quantity of HARQ processes that are currently used by the micro eNodeB in the secondary cell is less than a maximum quantity of HARQ processes, determine that the HARQ combination gain can be obtained by performing the HARQ on the RLC data packet by the micro eNodeB by using the secondary cell; when it is determined that the quantity of HARQ processes that are currently used by the micro eNodeB in the secondary cell is not less than the maximum quantity of HARQ processes, determine that the HARQ combination gain cannot be obtained by performing the HARQ on the RLC data packet by the micro eNodeB by using the secondary cell.

Optionally, in this embodiment of the present invention, the macro eNodeB further includes a retransmission module and a second sending module, and the retransmission module is configured to:

if the determining module 302 determines that the HARQ combination gain cannot be obtained by performing the HARQ on the RLC data packet by the micro eNodeB by using the secondary cell, retransmit the RLC data packet to the user equipment in an ARQ manner by using the primary cell and the second sending module.

Optionally, in this embodiment of the present invention, the macro eNodeB further includes a second receiving module.

The second receiving module is configured to: before the first receiving module 301 receives, by using the primary cell, the feedback information of the carrier aggregation user equipment for the RLC data packet that is transmitted by the micro eNodeB to the user equipment by using the secondary cell, receive an RLC packet assembly result sent by the micro eNodeB, where the RLC packet assembly result is used to indicate information about the RLC data packet that is transmitted by the micro eNodeB to the user equipment by using the secondary cell, and the RLC data packet that is transmitted by the micro eNodeB to the user equipment by using the secondary cell is some or all of RLC data packets that are offloaded by the macro eNodeB to the micro eNodeB.

The retransmission module is specifically configured to retransmit the RLC data packet to the user equipment in the ARQ manner according to the RLC packet assembly result by using the primary cell and the second sending module.

Optionally, in this embodiment of the present invention, the first sending module 303 is further configured to:

if the determining module 302 determines that the HARQ combination gain cannot be obtained by performing the HARQ on the RLC data packet by the micro eNodeB by using the secondary cell, send the feedback information to the micro eNodeB, and instruct the micro eNodeB to retransmit the RLC data packet to the user equipment in an ARQ manner by using the secondary cell.

Figure 4:
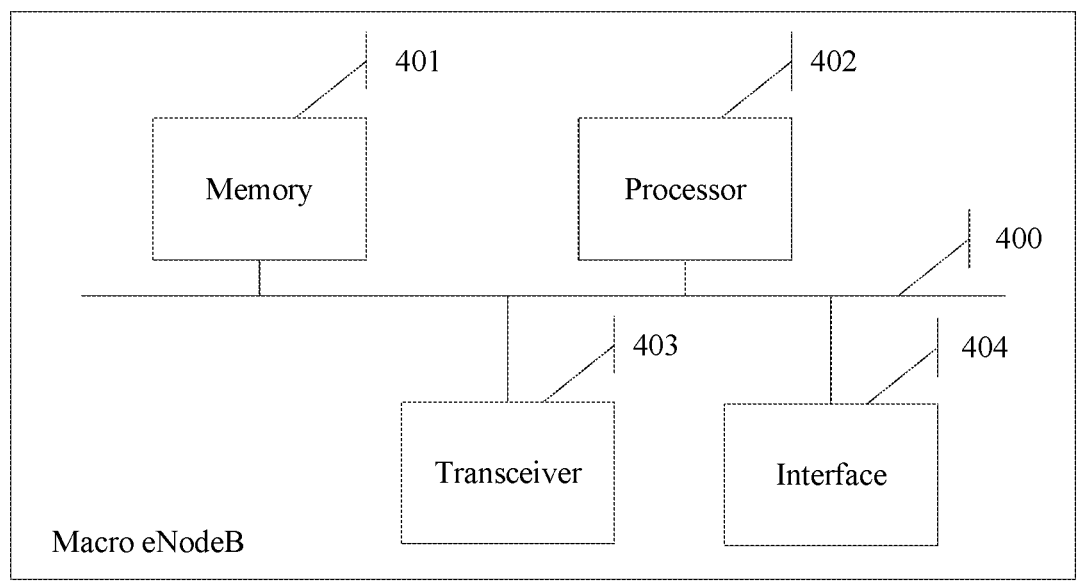
FIG. 4 is a schematic structural diagram of a macro eNodeB according to an embodiment of the present invention.

Referring to FIG. 4, based on a same inventive concept, an embodiment of the present invention provides a macro eNodeB, and the macro eNodeB includes a memory 401, a processor 402, a transceiver 403, and an interface 404 that are connected to a bus 400.

The memory 401 is configured to store an instruction required by the processor 402 to execute a task.

The transceiver 403 is configured to receive, by using a primary cell, feedback information of a carrier aggregation user equipment for an RLC data packet that is transmitted by a micro eNodeB to the user equipment by using a secondary cell, where the user equipment camps on the primary cell, and carrier aggregation is performed between the user equipment and each of the macro eNodeB and the micro eNodeB.

The processor 402 invokes the instruction stored in the memory 401 to: if the feedback information is a NACK, determine whether a HARQ combination gain can be obtained by performing a HARQ on the RLC data packet by the micro eNodeB by using the secondary cell; and if the HARQ combination gain can be obtained, send the feedback information to the micro eNodeB by using the interface 404, and instruct the micro eNodeB to retransmit the RLC data packet to the user equipment in a HARQ manner.

Optionally, in this embodiment of the present invention, the processor 402 is specifically configured to:

when it is determined that a quantity of HARQ processes that are currently used by the micro eNodeB in the secondary cell is less than a maximum quantity of HARQ processes, determine that the HARQ combination gain can be obtained by performing the HARQ on the RLC data packet by the micro eNodeB by using the secondary cell; when it is determined that the quantity of HARQ processes that are currently used by the micro eNodeB in the secondary cell is not less than the maximum quantity of HARQ processes, determine that the HARQ combination gain cannot be obtained by performing the HARQ on the RLC data packet by the micro eNodeB by using the secondary cell.

Optionally, in this embodiment of the present invention, the processor 402 is further configured to:

if it is determined that the HARQ combination gain cannot be obtained by performing the HARQ on the RLC data packet by the micro eNodeB by using the secondary cell, retransmit the RLC data packet to the user equipment in an ARQ manner by using the primary cell and the transceiver 403.

Optionally, in this embodiment of the present invention, the interface 404 is configured to: before the transceiver 403 receives, by using the primary cell, the feedback information of the carrier aggregation user equipment for the RLC data packet that is transmitted by the micro eNodeB to the user equipment by using the secondary cell, receive an RLC packet assembly result sent by the micro eNodeB, where the RLC packet assembly result is used to indicate information about the RLC data packet that is transmitted by the micro eNodeB to the user equipment by using the secondary cell, and the RLC data packet that is transmitted by the micro eNodeB to the user equipment by using the secondary cell is some or all of RLC data packets that are offloaded by the macro eNodeB to the micro eNodeB; and the processor 402 is specifically configured to retransmit the RLC data packet to the user equipment in the ARQ manner according to the RLC packet assembly result by using the primary cell and the transceiver 403.

Optionally, in this embodiment of the present invention, the processor 402 is further configured to:

if it is determined that the HARQ combination gain cannot be obtained by performing the HARQ on the RLC data packet by the micro eNodeB by using the secondary cell, send the feedback information to the micro eNodeB by using the interface 404, and instruct the micro eNodeB to retransmit the RLC data packet to the user equipment in an ARQ manner by using the secondary cell.

In the embodiments of the present invention, if feedback information that is received by a macro eNodeB for an RLC data packet transmitted by a micro eNodeB is a NACK, the macro eNodeB determines whether a HARQ combination gain can be obtained by performing a HARQ on the RLC data packet by the micro eNodeB, that is, whether a delay is relatively small. If the HARQ combination gain can be obtained, the micro eNodeB retransmits the RLC data packet to a user equipment in a HARQ manner. In this way, the retransmission delay is relatively small, and impact on a throughput of the user equipment is avoided as much as possible. The RLC data packet does not need to be retransmitted in an ARQ manner because the RLC data packet is processed in the HARQ manner. In addition, a quantity of retransmission times can be reduced in the HARQ manner, and RLC data packet retransmission efficiency can be improved.

It may be clearly understood by a person skilled in the art that, for the purpose of convenient and brief description, division of the foregoing function modules is taken as an example for illustration. In actual application, the foregoing functions can be allocated to different function modules and implemented as appropriate, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing embodiments are only used to describe the technical solutions of this application. The foregoing embodiments are only intended to help understand the method and core idea of the present invention, and shall not be construed as a limitation on the present invention. Any variation or replacement readily figured out by a person skilled in the art within the technical scope disclosed in the present invention shall fall within the protection scope of the present invention. Additionally, statements made herein characterizing the invention refer to an embodiment of the invention and not necessarily all embodiments.

What is claimed is:

1. A Radio Link Control (RLC) data packet retransmission method, comprising:
receiving, by a macro eNodeB by using a primary cell, feedback information of a user equipment for an RLC data packet that is transmitted by a micro eNodeB to the user equipment by using a secondary cell, wherein the user equipment camps on the primary cell, and carrier aggregation is performed between the user equipment and each of the macro eNodeB and the micro eNodeB;
in response to the feedback information being a negative acknowledgement (NACK), determining, by the macro eNodeB, whether a hybrid automatic repeat request (HARQ) combination gain can be obtained by performing a HARQ on the RLC data packet by the micro eNodeB by using the secondary cell; and
in response to determining that the HARQ combination gain can be obtained, sending, by the macro eNodeB, the feedback information to the micro eNodeB, and instructing the micro eNodeB to retransmit the RLC data packet to the user equipment in a HARQ manner;
wherein determining whether the HARQ combination gain can be obtained comprises: in response to the macro eNodeB determining that a quantity of HARQ processes that are currently used by the micro eNodeB in the secondary cell is less than a maximum quantity of HARQ processes, determining, by the macro eNodeB, that the HARQ combination gain can be obtained by performing the HARQ on the RLC data packet by the micro eNodeB by using the secondary cell.

2. A macro eNodeB, comprising:
a memory, a processor, a transceiver, and an interface that are connected to a same bus;
wherein the memory is configured to store processor-executable instructions;
wherein the transceiver is configured to receive, by using a primary cell, feedback information of a user equipment for a Radio Link Control (RLC) data packet that is transmitted by a micro eNodeB to the user equipment by using a secondary cell, wherein the user equipment camps on the primary cell, and carrier aggregation is performed between the user equipment and each of the macro eNodeB and the micro eNodeB; and
wherein the processor is configured to execute the processor-executable instructions stored in the memory to facilitate:
if the feedback information is a negative acknowledgement (NACK), determining whether a hybrid automatic repeat request (HARQ) combination gain can be obtained by performing a HARQ on the RLC data packet by the micro eNodeB by using the secondary cell; and
if the HARQ combination gain can be obtained, sending the feedback information to the micro eNodeB by using the interface, and instructing the micro eNodeB to retransmit the RLC data packet to the user equipment in a HARQ manner;
wherein determining whether the HARQ combination gain can be obtained comprises: if a quantity of HARQ processes that are currently used by the micro eNodeB in the secondary cell is less than a maximum quantity of HARQ processes, determining that the HARQ combination gain can be obtained by performing the HARQ on the RLC data packet by the micro eNodeB by using the secondary cell.

3. The macro eNodeB according to claim 2, wherein the processor is further configured to execute the processor-executable instructions stored in the memory to facilitate:
if the HARQ combination gain cannot be obtained by performing the HARQ on the RLC data packet by the micro eNodeB by using the secondary cell, retransmitting the RLC data packet to the user equipment in an automatic repeat request (ARQ) manner by using the primary cell and the transceiver.

4. The macro eNodeB according to claim 3, wherein the interface is configured to: receive an RLC packet assembly result sent by the micro eNodeB before the transceiver receives the feedback information, wherein the RLC packet assembly result indicates information about the RLC data packet that is transmitted by the micro eNodeB to the user equipment by using the secondary cell, and the RLC data packet that is transmitted by the micro eNodeB to the user equipment by using the secondary cell is some or all of RLC data packets that are offloaded by the macro eNodeB to the micro eNodeB; and
wherein retransmitting the RLC data packet to the user equipment further comprises:
retransmitting the RLC data packet to the user equipment in the ARQ manner according to the RLC packet assembly result by using the primary cell and the transceiver.

5. The macro eNodeB according to claim 2, wherein the processor is further configured to execute the processor-executable instructions stored in the memory to facilitate:
if the HARQ combination gain cannot be obtained by performing the HARQ on the RLC data packet by the micro eNodeB by using the secondary cell, sending the feedback information to the micro eNodeB by using the interface, and instructing the micro eNodeB to retransmit the RLC data packet to the user equipment in an automatic repeat request (ARQ) manner by using the secondary cell.

6. A Radio Link Control (RLC) data packet retransmission method, comprising:
receiving, by a macro eNodeB by using a primary cell, feedback information of a user equipment for an RLC data packet that is transmitted by a micro eNodeB to the user equipment by using a secondary cell, wherein the user equipment camps on the primary cell, and carrier aggregation is performed between the user equipment and each of the macro eNodeB and the micro eNodeB;
in response to the feedback information being a negative acknowledgement (NACK), determining, by the macro eNodeB, whether a hybrid automatic repeat request (HARQ) combination gain can be obtained by performing a HARQ on the RLC data packet by the micro eNodeB by using the secondary cell; and
in response to determining that the HARQ combination gain cannot be obtained by performing the HARQ on the RLC data packet by the micro eNodeB by using the secondary cell, retransmitting, by the macro eNodeB, the RLC data packet to the user equipment in an automatic repeat request (ARQ) manner by using the primary cell;
wherein determining whether the HARQ combination gain can be obtained comprises: in response to the macro eNodeB determining that a quantity of HARQ processes that are currently used by the micro eNodeB in the secondary cell is not less than a maximum quantity of HARQ processes, determining, by the macro eNodeB, that the HARQ combination gain cannot be obtained by performing the HARQ on the RLC data packet by the micro eNodeB by using the secondary cell.

7. The method according to claim 6, wherein before receiving the feedback information, the method further comprises:
    receiving, by the macro eNodeB, an RLC packet assembly result sent by the micro eNodeB, wherein the RLC packet assembly result is used to indicate information about the RLC data packet that is transmitted by the micro eNodeB to the user equipment by using the secondary cell, and the RLC data packet that is transmitted by the micro eNodeB to the user equipment by using the secondary cell is some or all of RLC data packets that are offloaded by the macro eNodeB to the micro eNodeB; and
    wherein retransmitting the RLC data packet to the user equipment further comprises:
    retransmitting, by the macro eNodeB, the RLC data packet to the user equipment in the ARQ manner according to the RLC packet assembly result by using the primary cell.

8. A Radio Link Control (RLC) data packet retransmission method, comprising:
    receiving, by a macro eNodeB by using a primary cell, feedback information of a user equipment for an RLC data packet that is transmitted by a micro eNodeB to the user equipment by using a secondary cell, wherein the user equipment camps on the primary cell, and carrier aggregation is performed between the user equipment and each of the macro eNodeB and the micro eNodeB;
    in response to the feedback information being a negative acknowledgement (NACK), determining, by the macro eNodeB, whether a hybrid automatic repeat request (HARQ) combination gain can be obtained by performing a HARQ on the RLC data packet by the micro eNodeB by using the secondary cell; and
    in response to determining that the HARQ combination gain cannot be obtained by performing the HARQ on the RLC data packet by the micro eNodeB by using the secondary cell, sending, by the macro eNodeB, the feedback information to the micro eNodeB, and instructing the micro eNodeB to retransmit the RLC data packet to the user equipment in an automatic repeat request (ARQ) manner by using the secondary cell;
    wherein determining whether the HARQ combination gain can be obtained comprises: in response to the macro eNodeB determining that a quantity of HARQ processes that are currently used by the micro eNodeB in the secondary cell is not less than a maximum quantity of HARQ processes, determining, by the macro eNodeB, that the HARQ combination gain cannot be obtained by performing the HARQ on the RLC data packet by the micro eNodeB by using the secondary cell.

* * * * *